Dec. 15, 1959 M. J. CARPINELLA 2,916,788
PRONG RING FASTENER MEMBERS
Filed July 23, 1956

INVENTOR
Michael J. Carpinella
BY
H. F. Johnston
ATTORNEY

United States Patent Office 2,916,788
Patented Dec. 15, 1959

2,916,788

PRONG RING FASTENER MEMBERS

Michael J. Carpinella, Waterbury, Conn., assignor to Scovill Manufacturing Company, Waterbury, Conn., a corporation of Connecticut Application July 23, 1956, Serial No. 599,429

4 Claims. (Cl. 24—216)

This invention relates generally to snap fasteners and particularly to an attaching member generally known as a prong ring for securing a socket member to articles of clothing or the like.

Prong rings in the past have been made with center openings. These center openings have been objectionable when the prong rings were used to attach fastener members to the cuffs or fronts of high grade shirts or similar garments. When such prong rings were used the garment material would be forced upwardly through said openings to a plane higher than the surrounding material thus subjecting this elevated portion of the fabric to a greater amount of surface wear and tear and consequently quickly soiling and wearing out that exposed portion of the garment. Prior attempts to solve this problem as by molding a central insert in the ring have been too expensive and otherwise objectionable. According to my invention this problem is solved by providing a center disc adapted to be asembled to the prong ring and to close the center opening.

One objective is to make this disc simple and inexpensive and to provide an integral means for securely attaching it to the ring. The fact that the center disc can be made separately from the prong ring allows the disc to be made either from metal or plastic material thus permitting a color selection that will harmonize with the garment to which the fastener members are attached.

Another object is to provide a disc that can be attached to a prong ring and so interfitted that the upper surface of the disc is substantially flush with the upper surface of the prong ring.

Figure 1:
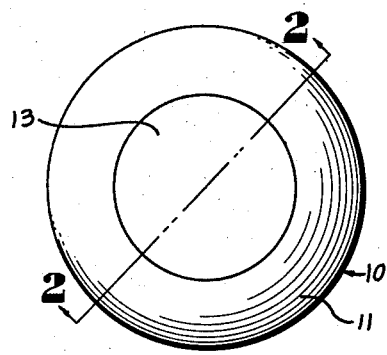
Fig. 1 is a plan view of a prong ring fastener member embodying my invention.

Referring now to the drawing in which like numerals designate like parts, the numeral 10 refers generally to a prong ring fastened member consisting of an annulus 11 having a series of tapered prongs 12 projecting downwardly from its inner periphery. The annulus 11 is preferably formed on a slight arc extending outwardly and downward from its center opening.

Figure 6:
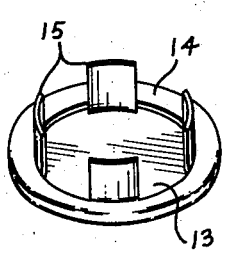
Fig. 6 is a perspective view of the underside of the insert disc.
Figure 2:
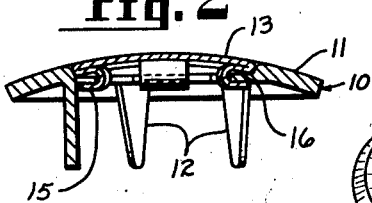
Fig. 2 is a cross sectional view taken along the line 2—2 of Fig. 1.
Figure 9:
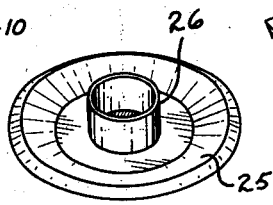
Fig. 9 is a perspective view of the underside of the modified insert disc.

In order to improve the appearance of the prong ring as well as its functional characteristics, an insert member or disc 13 is provided to close or fill in the opening normally existing in the prong ring. One form of insert member, as shown in Figs. 2 and 6, is made of sheet metal material of a thickness considerably less than the material used for the prong ring. The outer edge of the disc 13 is formed with a rim 14 that is folded against the underside of said disc. A series of clamping lugs 15 are formed as an integral part of the rim 14 at its inner periphery and project away from the disc 13 as seen in Fig. 6.

Figure 4:
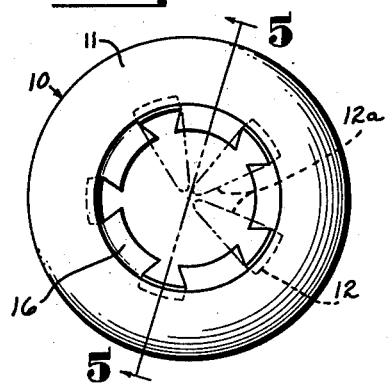
Fig. 4 is a view similar to Fig. 3 minus the center insert disc.
Figure 5:
Fig. 5 is a cross sectional view taken along the line 5—5 of Fig. 4.

In order to provide a means to support the disc 13 within the opening of the annulus 11, a series of tongues 16 extend radially inwardly from the inner edge of said annulus between the prongs 12. These tongues 16 in their original form are of the same thickness as the ring stock and are later swaged so as to flatten them out to about one-half the thickness of the ring stock. This swaging of the tongues 16 partially closes up the space that initially existed between said tongues and within which space the prongs 12 initially lie, as indicated in dotted outline at 12a in Fig. 4, and also depresses the upper surface of said tongues below the upper surface of the annulus 11 for reasons as will appear later. (See Fig. 5). These tongues 16 collectively provide a ledge upon which the insert disc 13 is supported when assembled in the annulus 11.

Figure 3:
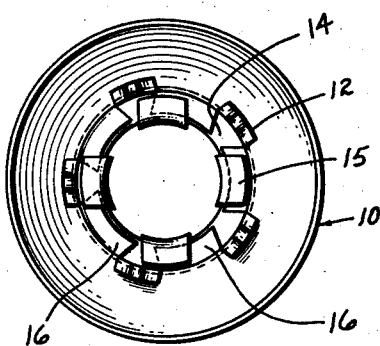
Fig. 3 is a plan view of the underside of Fig. 2.
Figure 8:
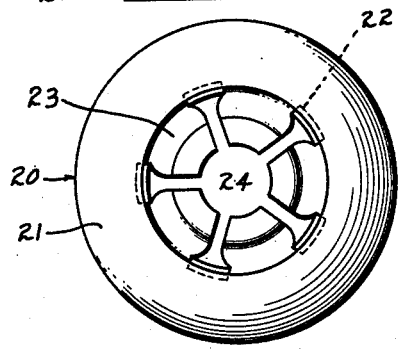
Fig. 8 is a plan view of the underside of the prong ring per se.

In assembling the insert disc 13 in the prong ring fastener member 10 said disc is inserted into the annulus opening with its folded rim 14 resting upon the tongues 16 after which the lugs 15 are folded about the edge of said tongues to the position shown in Fig. 2. It will be observed that there are only four clamping lugs 15 on the disc 13 and five tongues 16 extending inwardly from the annulus 11 and that the width of the lugs 15 is greater than the space between said tongues 16 so that the folded lugs 15 are always in clamping engagement with some portion of the tongues 16, see Fig. 3. The fact that the tongues 16 are depressed below the surface of the annulus 11 assures that the upper surface of the insert disc 13 will be substantially flush with the upper surface of the annulus 11 when the two parts are assembled. Also the upper surface of the disc 13 and the annulus 11 are preferably of arcuate shape or crowned to strengthen as well as to enhance the appearance of the fastener member.

Figure 7:
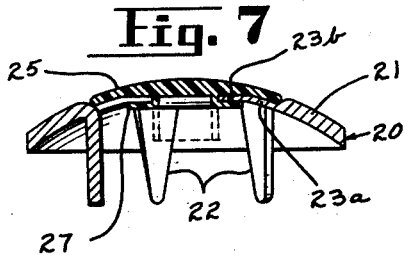
Fig. 7 is a modified form of construction showing an insert disc made from plastic material.

A modified form of construction is shown in Figs. 7–10 wherein a plastic insert or a preformed metal insert is employed to close the center opening in the prong ring. In this form the prong ring 20 has an annulus 21 formed on an arc of a smaller radius than that shown in the first form of the invention. The usual tapered prongs 22 are formed integral with and project downwardly from the inner edge of the annulus 21. Extending radially inwardly from the annulus 21 and between the prongs 22 are a series of tongues 23. Similar to the tongue 16 in the first form these tongues 23 are swaged or otherwise reformed to reduce their thickness and also to be offset downwardly from the upper surface of the annulus 21. These tongues 23 extend inwardly a considerable distance from the annulus 21 and their tip ends define an opening 24. As shown in Fig. 7 a portion of the tongues 23 adjacent the annulus 21 as indicated at 23a is formed on an arc comparable to the arc of the annulus 21 while the inner ends 23b are flattened out on a plane perpendicular to the axis of the prong ring 20.

A center insert disc 25 has a central tubular neck 26 extending from its underside. The underside of the disc 25 is shaped to conform to the shape of the top surface of the tongues 23 when nested thereagainst and having the central tubular neck 26 projecting through the opening 24 after which the neck may be riveted over as at 27 in Fig. 7 to permanently hold the prong ring and insert disc together. The shape of the disc 25 is such that it may be made either from plastic material or a metal slug.

Figure 10:
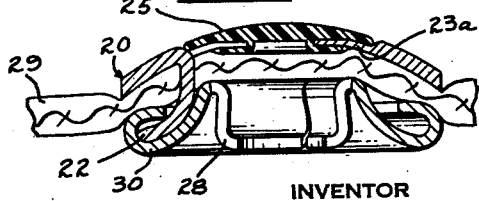
Fig. 10 is a sectional view of the fastener member attached to a socket member through a support.

Fig. 10 shows the prong ring 20 attached to a conventional socket 28 wherein the prongs 22 are pierced through a piece of support material 29 and then formed downwardly and clinched in the anvil section 30 of said socket. It will be noted from this assembly that by having the tongue sections 23a arced upwardly affords more room for the interposed support material 29 and allows the prong ring to get a firmer grip in the socket 28.

Minor changes in details of the construction and arrangement of parts may be made without departing from the scope of the present invention as set forth in the appended claims.

I claim:

1. A prong member for attaching fastener elements comprising a metallic annulus having a plurality of prongs extending from the inner periphery thereof, tongues extending radially inwardly between said prongs and defining a central opening substantially smaller than the inner circle of the annulus and an insert fitting the inside periphery of said annulus and having means extending through said central opening for attaching the insert to said tongues.

2. A prong member for attaching fastener elements comprising a metallic annulus having a plurality of prongs extending from the inner periphery thereof, tongues extending radially inwardly from the inner edge of said annulus, said tongues being disposed below the upper surface of the annulus and providing a ledge, an insert fitting the inside periphery of said annulus and resting upon said ledge in such position that its upper surface is substantially flush with the upper surface of said annulus, and means for securing said insert to said ledge.

3. A prong member for attaching fastener elements comprising a metallic annulus having a plurality of prongs extending from the inner periphery thereof, tongues extending radially inwardly from the inner edge of said annulus, said tongues being disposed below the upper surface of the rim and providing a ledge, an insert disc fitting the inside periphery of said rim, said disc having a rim extended under and adjacent its peripheral surface which rim rests upon said ledge and lug means extending from the inner edge of said disc rim and under said ledge as a means for securing said disc to said prong member.

4. A prong member for attaching fastener elements comprising a metallic annulus having a plurality of prongs extending from the inner periphery thereof, said annulus being arced downwardly from its center opening, tongues extending radially inwardly from the inner edge of said annulus and between said prongs to provide a ledge, said tongues extending below the upper surface of said annulus, the attached end portions of said tongue being arced upwardly and their inner ends flattened in a plane perpendicular to the axis of the prong member, an insert fitting the inside periphery of said annulus and resting upon said ledge, the outer surface of the insert being flush with the arced outer surface of the annulus, and means for securing said insert upon said ledge.

References Cited in the file of this patent

UNITED STATES PATENTS

| Re. 17,581 | Carr | Feb. 4, 1930 |
| 566,338 | Richardson | Aug. 25, 1896 |
| 712,622 | Traut | Nov. 4, 1902 |
| 755,407 | Stein | Mar. 22, 1904 |
| 772,158 | Lane | Oct. 11, 1904 |
| 834,035 | Washburne | Oct. 23, 1906 |
| 1,044,111 | Williams | Nov. 12, 1912 |